United States Patent [19]

Ottosson

[11] Patent Number: 4,830,166
[45] Date of Patent: May 16, 1989

[54] COLLAPSIBLE ROLL CONVEYOR

[76] Inventor: Folke Ottosson, von Holtens väg 5, Lerum, Sweden, 44300

[21] Appl. No.: 104,867

[22] PCT Filed: Jan. 26, 1987

[86] PCT No.: PCT/SE87/00030
§ 371 Date: Sep. 28, 1987
§ 102(e) Date: Sep. 28, 1987

[87] PCT Pub. No.: WO87/04410
PCT Pub. Date: Jul. 30, 1987

[30] Foreign Application Priority Data

Jan. 27, 1986 [SE] Sweden .................. 8600351

[51] Int. Cl.$^4$ ............................. B65G 13/12
[52] U.S. Cl. .................... 193/35 TE; 193/35 F; 193/35 J; 414/532
[58] Field of Search ............... 193/35 TE, 35 F, 35 J; 198/588, 594, 779; 414/529, 532, 533; 410/92

[56] References Cited

U.S. PATENT DOCUMENTS 2,938,614  5/1960  Hewitt, Jr. .................. 193/35 TE
3,276,558 10/1966  Guske et al. ................ 193/35 TE

FOREIGN PATENT DOCUMENTS 2119077 11/1972  Fed. Rep. of Germany .
1756208 11/1974  Fed. Rep. of Germany .
1160200  7/1969  United Kingdom .......... 193/35 TE Primary Examiner—Frank E. Werner
Assistant Examiner—Lyle K. Kimms
Attorney, Agent, or Firm—Holman & Stern

[57] ABSTRACT

A roller conveyor comprises rollers (10) journalled on through shafts (13), which are linked together by means of alternatingly arranged links (11, 11a). Links (11a) mounted between adjacent rollers (10) on a mutual shaft (13) have support surfaces (12) on one side of the plane of the conveyor. These links (11a) are placed separately, so that links on each side of one roller (10) are linked to different adjacent shafts (13) and are pivotable at least 135° to each side of the conveyor plane.

8 Claims, 3 Drawing Sheets

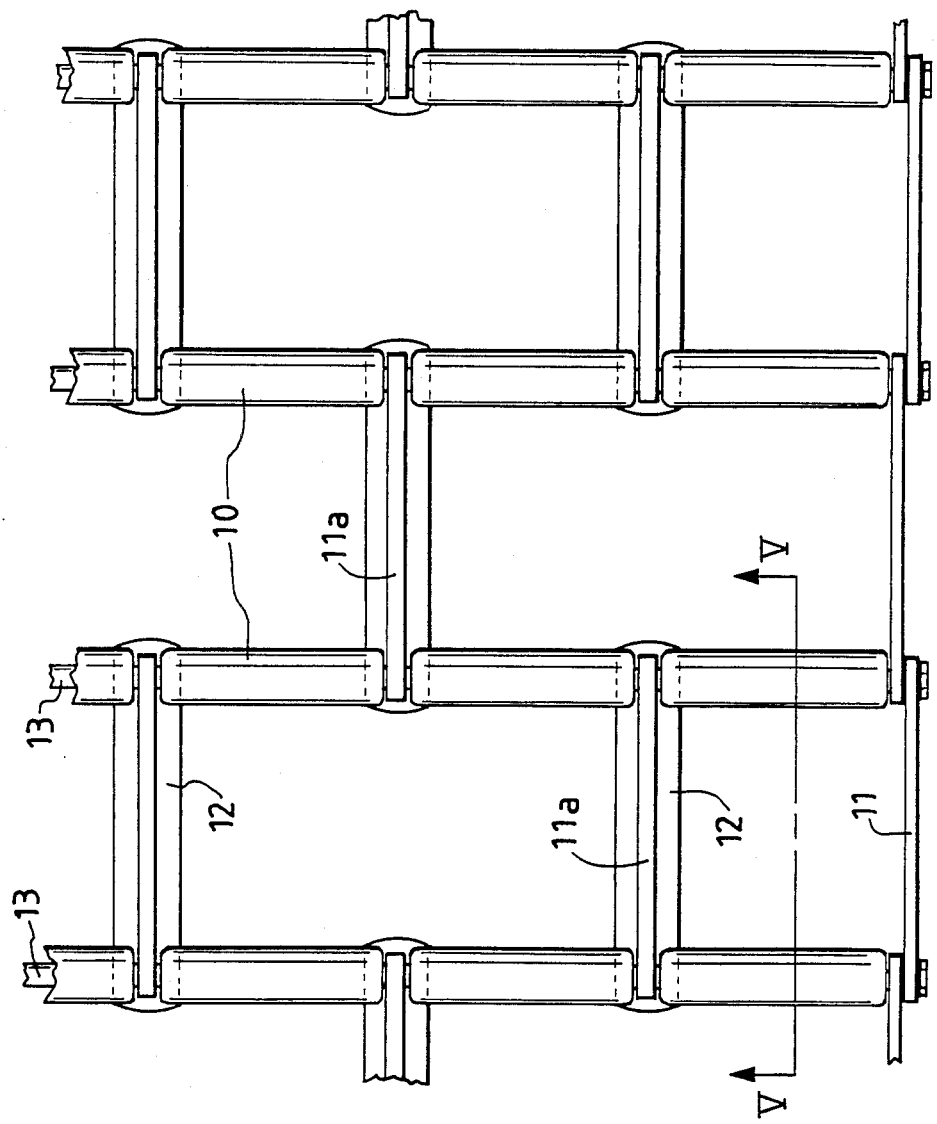

COLLAPSIBLE ROLL CONVEYOR

BACKGROUND OF THE INVENTION

1. Field of the Invention

The present invention relates to a device for moving objects along horizontal or inclined surfaces, e.g. within narrow and low spaces and more particularly to a foldable complete roller conveyor system for moving of objects.

2. Description of the Prior Art

Known systems are only suitable for commercial use and are not intended for private use, e.g. in station-wagons. This is due to the fact that known systems are:

(a) stationary and often adapted to certain terminal buildings or cars, (b) only suited for use with pallets and pallet loaders, and (c) not adapted to be carried along during transport of light objects, distribution, etc.

Known conveyor systems are normally rigid and made self-supporting and tailor made for a certain use. The self-supporting design makes them too heavy to handle by one person so that facilities are needed if they are to be lifted to or from a vehicle. Presently, no inexpensive means are available to solve this aspect of the transporting problem which comprise dangerous manual lifting operations.

BRIEF SUMMARY OF THE INVENTION

The object of the present invention is therefore to solve the above problem, so that these injurious effects can be avoided.

This object is achieved by the invention in a roller conveyor comprising rollers journalled on through shafts, which are linked together by means of alternatingly arranged links. The roll conveyor is characterized in that links mounted between adjacent rollers on a mutual shaft have support means on one side of the plane of the conveyor, and that these links are placed separately, so that links on each side of one roller are linked to different adjacent shafts and pivotable at least 135° to each side of the conveyor plane.

BRIEF DESCRIPTION OF THE DRAWINGS

The invention is described below in greater detail with reference to an embodiment shown in the accompanying drawings wherein:

FIG. 2 is an enlarged view of a section of the conveyor in FIG. 1;

DETAILED DESCRIPTION

Figure 1:
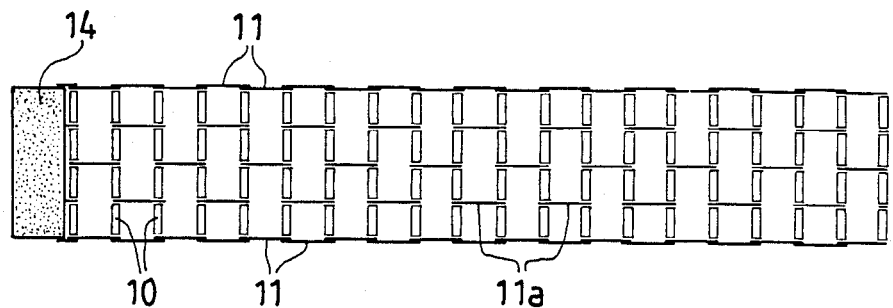
FIG. 1 is a top plan view of the roller conveyor according to the invention.
Figure 3:
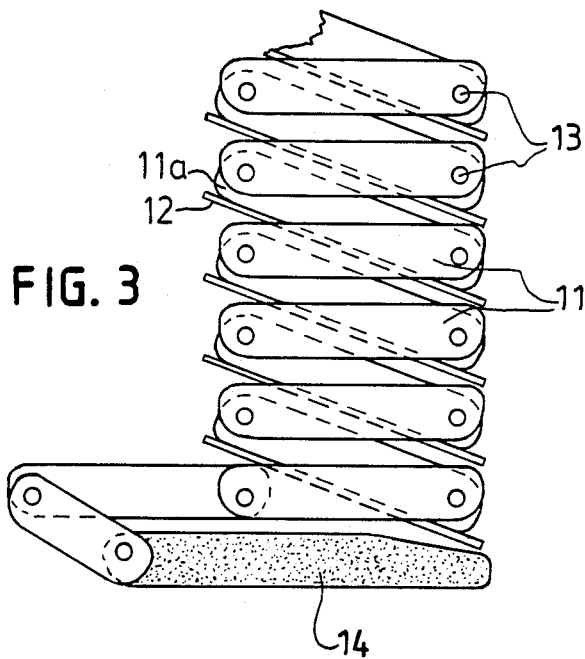
FIG. 3 is a side elevational view showing a part of the conveyor in a collapsed state, the rollers being omitted for clarity.
Figure 4:
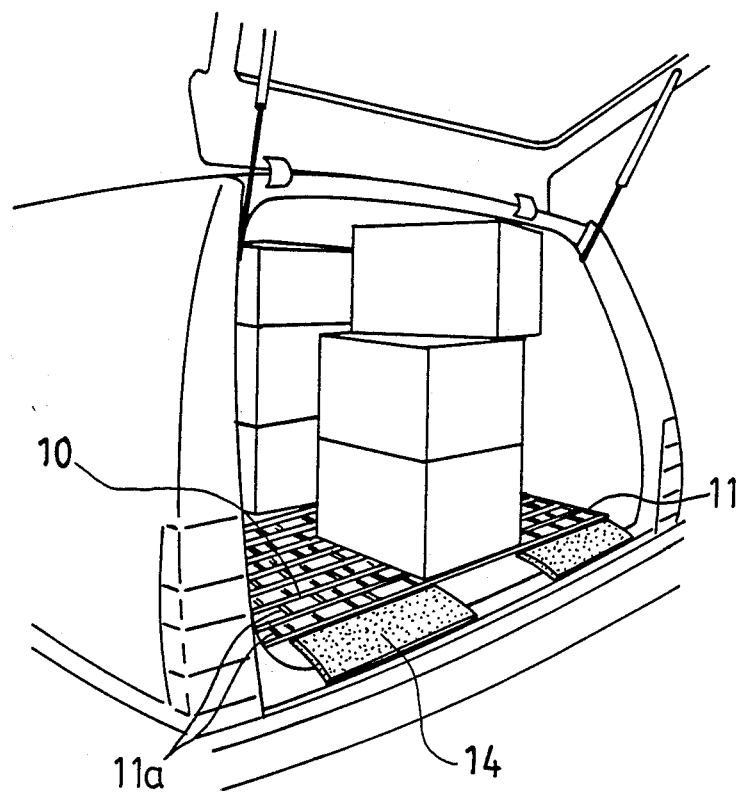
FIG. 4 is a perspective view which depicts the roll conveyor of FIG. 1 during use in a station-wagon.
Figure 5:
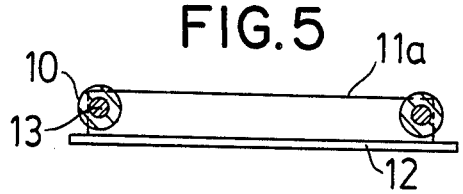

The roller conveyor comprises a number of rollers 10 which are journalled on and joined by means of shafts 13 and links 11, 11a, so that the load is distributed evenly, via support surfaces 12 on the links 11a upon the base surface of the transporting vehicle. Support surfaces 12 may be provided by rectangular elongated members integral with or fastened to links 11a. For example, members 11a and 12 may be cast in one piece, from synthetic resin material or light metal. If formed separately, these members may be fastened together by any well known means such as screw fasteners, or adhesives.

Since the shafts 13 act as articulation points for the links 11, 11a the conveyor can be adapted to the base surface, e.g. at thresholds and stairs.

A turntable can be used between two conveyors placed at right angles to each other.

An end segment 14 is linked to the links 11, 11a of the conveyor. This segment 14 is produced from a material of non-skid quality anchoring the conveyor to the base surface.

The objects may be fastened by straps, when they have been shifted into the vehicle.

When not in use, the conveyor can easily be folded about the shafts 13, in any direction, into a compact size, without the need for tools. This means that the conveyor according to the invention is convenient to carry or store.

The conveyor can also be transported on its own rollers, when turned over so that the rollers normally on top are on the bottom side.

The end segment can be folded in below the conveyor, acting as a stop preventing an object on the conveyor from sliding off the conveyor.

The foldability can be useful when shifting an object from the ground into the cargo space of a station-wagon.

The roller conveyor of the invention can have a wide range of applications, e.g. it may replace a pallet loader.

I claim:

1. A roller conveyor having rollers journalled on shafts linked together by alternatingly arranged links comprising:

a plurality of spaced elongated shafts;

a plurality of rollers rotatably mounted on each shaft in longitudinal spaced relationship;

a plurality of links each having opposite end portions pivotally connected to adjacent shafts between adjacent rollers on each adjacent shaft, said links being longitudinally spaced and being alternatingly arranged so that adjacent links having end portions connected to a common shaft have the opposite end portions thereof pivotally connected to different shafts adjacent to said common shaft and said links are pivotable at least 135° on each side of a conveyor plane in which the conveyor substantially extends during use; and a plurality of support means on one side of said conveyor plane for supporting said rollers in rotatable condition during use.

2. A roller conveyor as claimed in claim 1 and further comprising: and end segment of non-skid material connected to end links at one end of said conveyor.

3. A roller conveyor as claimed in claim 2 wherein: said end segment is pivotally connected to said end links.

4. A roller conveyor as claimed in claim 1 wherein: said links comprise elongated rectangular shaped planar elements.

5. A roller conveyor as claimed in claim 4 wherein: said support means comprises elongated rectangular shaped planar elements positioned substantially transversally to said planar shaped link elements.

6. A roller conveyor as claimed in claim 1 wherein: said support means are integral with said links.

7. A roller conveyor as claimed in claim 5 wherein:

said planar support elements are provided on substantially all said planar link elements and are integral therewith.

8. A roller conveyor as claimed in claim 1 wherein: said rollers have outer surfaces extending beyond said links in the direction with respect to the conveyor opposite to said support means during use.

* * * * *